United States Patent [19]

Hirai et al.

[11] 3,976,167

[45] Aug. 24, 1976

[54] BRAKE PAD WITH WEAR INDICATOR

[75] Inventors: Akiyoshi Hirai, Toyota; Masachika Yamamoto; Ryoichi Kimura, both of Itami, all of Japan

[73] Assignees: Sumitomo Electric Indusries, Ltd., Osaka; Toyota Jidosha Kogyo Kabushiki Kaisha, Toyota, both of Japan

[22] Filed: Feb. 26, 1975

[21] Appl. No.: 553,413

[30] Foreign Application Priority Data

Feb. 26, 1974 Japan.......................... 49-23703[U]

[52] U.S. Cl................................................. 188/1 A
[51] Int. Cl.² ......................................... F16D 66/02
[58] Field of Search.................... 188/1 A; 340/52 A

[56] References Cited
UNITED STATES PATENTS

| | | | |
|---|---|---|---|
| 3,190,397 | 6/1965 | Sudres | 188/1 A |
| 3,398,246 | 8/1968 | Linet | 188/1 A UX |
| 3,783,979 | 1/1974 | Hess | 188/1 A |

FOREIGN PATENTS OR APPLICATIONS

| | | | |
|---|---|---|---|
| 1,570,517 | 5/1969 | France | 188/1 A |

Primary Examiner—Duane A. Reger
Attorney, Agent, or Firm—Sughrue, Rothwell, Mion, Zinn & Macpeak

[57] ABSTRACT

A disc brake pad having an integral backing plate on its rear surface is provided with a removable wear indicator. An insertion hole for the indicator extends through the backing plate and into the pad for a distance equal to the length of the wear indicator. To prevent the wear indicator from being forced backward out of the hole during operation of the brake, a thin plate is placed over the backing plate and firmly clamped thereto, thereby blocking rearward movement of the indicator.

5 Claims, 4 Drawing Figures

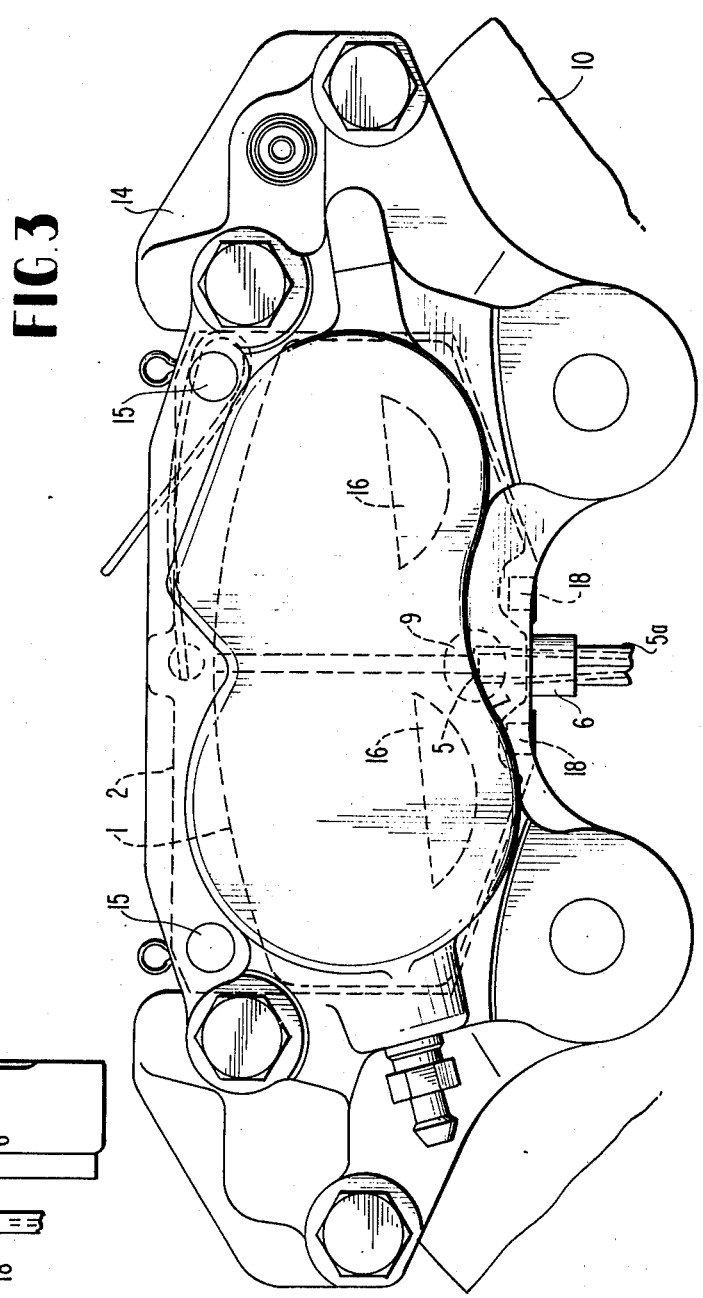
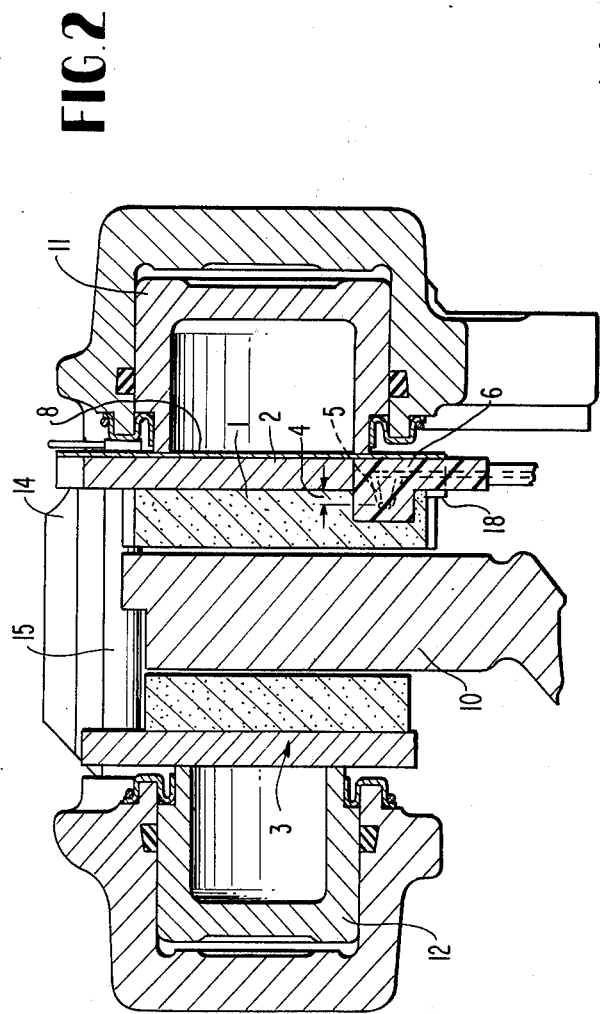

BRAKE PAD WITH WEAR INDICATOR

BACKGROUND OF THE INVENTION

1. Field of the Invention

This invention relates to the field of brake lining wear indicators, and more particularly, to an easily replaceable wear indicator for a friction pad of a disc brake assembly.

2. Description of the Prior Art

For facilitating the replacement of a brake wear indicator, it is well known generally to provide a hole for mounting the same in a backing plate of the friction brake pad as disclosed, for example, in Japanese Patent Laid Open Application No. 1568/1973. Such a wear indicator may, however, come into frictional engagement with the rotating disc and become detached due to the rotation torque of the disc when the friction pad is worn away to its safety limiting thickness. One known solution for such a problem is to insert the wear indicator through an aperture formed in the back side of the backing plate of the friction pad so that the indicator may neither escape toward the brading face nor in the radial direction of the disc. However, as the friction pad is gradually worn away, the top of the wear indicator first comes into contact with the disc before the indicator generates a wear alarm, and, when the top is pressed by the disc, the wear indicator is forced backward or retracted from the braking surface, thereby failing to give an alarm even when the pad lining is worn away beyond the level corresponding to a safety limiting thickness.

SUMMARY OF THE INVENTION

The inventors have succeeded in preventing such retraction of the wear indicator by modifying the conventional anti-squealing thin plate for disc brakes disclosed, for example, in Japanese Pat. No. 22441/1964 (corresponding to British Pat. No. 925,294).

This invention provides a brake wear indicator which can easily be inserted into a insertion hole apertured from the back side of the backing plate of the friction pad, and wherein the escapement and retraction of the indicator from the braking surface is prevented by securely fixing the aforementioned thin plate to the backing plate.

More specifically, this invention provides such as wear indicator for a friction pad wherein this thin plate is secured to the backing plate by two hooks bent toward the friction lining so that the thin plate is thereby positively restrained from being forced away from the backing plate, thereby effectively preventing retraction of the wear indicator away from the braking surface retraction, and also facilitating the thin plate's mounting to, or detaching from, the backing plate.

BRIEF DESCRIPTION OF THE DRAWING

More detailed features of this invention will be understood from the following description of a preferred embodiment thereof referring to the accompanying drawing wherein:

FIG. 2 is a cross-sectional view of the disc brake shown in FIG. 1 taken along the direction A;

FIG. 3 is a side view of the same disc brake; and

In the drawing, identical portions bear respectively identical reference numerals.

DETAILED DESCRIPTION OF THE PREFERRED EMBODIMENT

Figure 1:
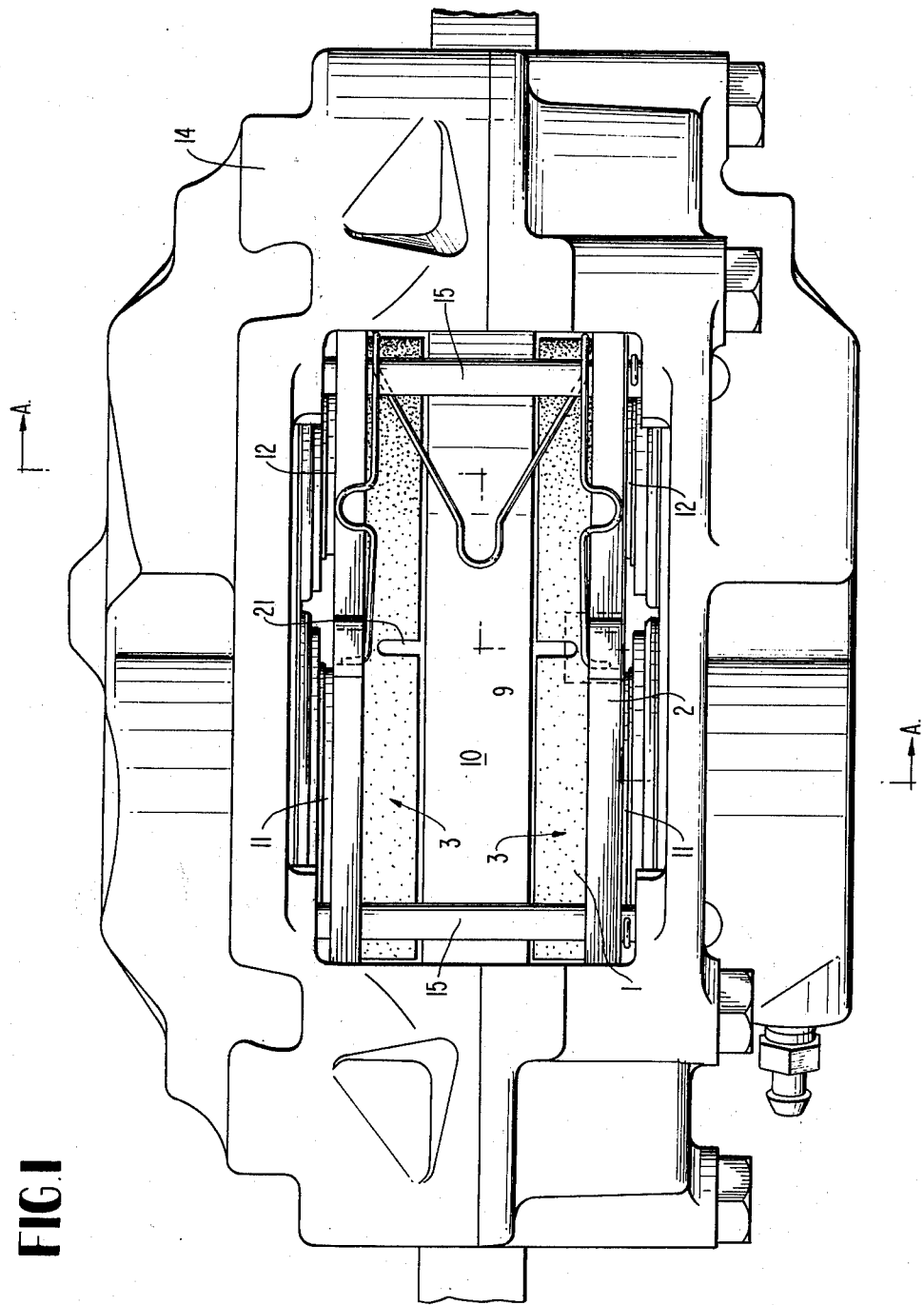
FIG. 1 is a plan view of a disc brake assembled with a wear indicator of this invention.

An opposed type disc brake loaded with a wear indicator of this invention is shown in FIGS. 1 through 3, wherein a pair of friction pads 3 adjacent the opposite braking faces of a brake disc 10 disposed between the friction pads are respectively forced against the disc faces by a pressing device composed of a combination of a larger diameter piston 11 and a smaller diameter piston 12 to thereby apply frictional braking action to the disc.

Each friction pad 3 is composed of a friction lining 1, for frictionally engaging the disc, and a backing plate 2, integrally formed with the pad and held by a guide pin 15 passing through a pin hole 13 formed in the backing plate and secured to a caliper 14. As can be seen from FIGS. 2 through 4, the friction pad 3 is apertured with an insertion hole 9 from the back side of the backing plate for enabling the insertion of a wear indicator 6 described below.

Figure 4:
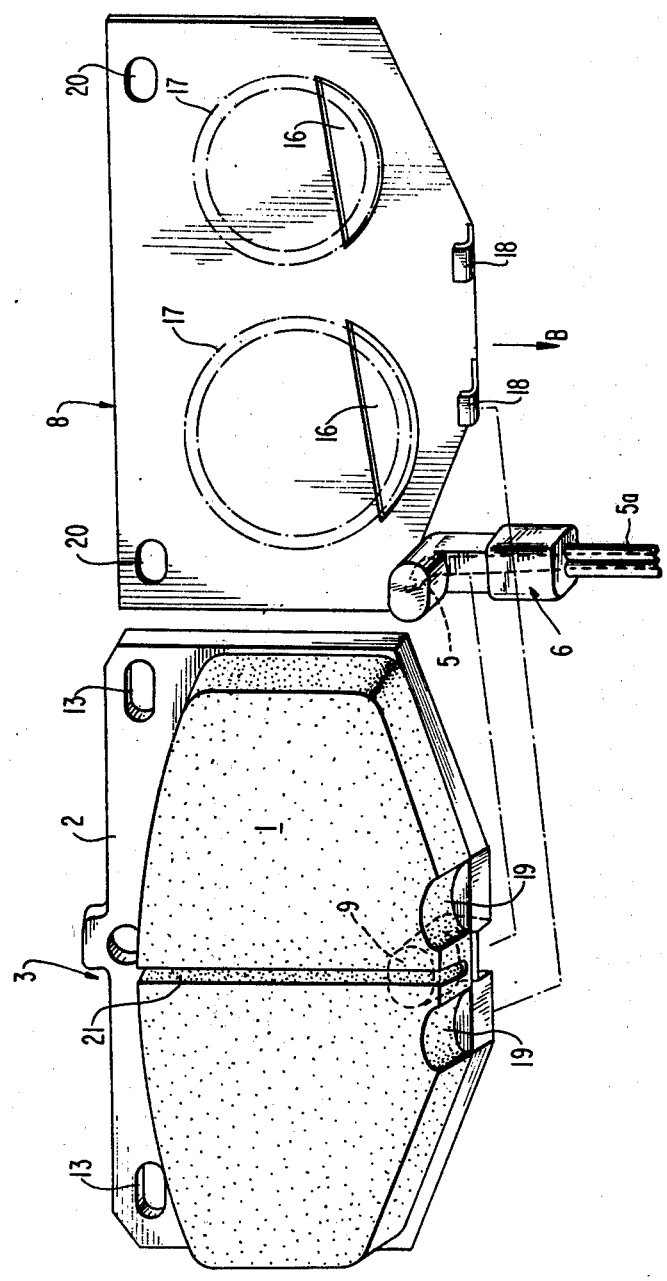
FIG. 4 is an exploded view of the disc brake pad and wear indicator.

The wear indicator 6 comprises a U-shaped electrical conductor 5 that is further bent into an L-shape configuration and connected to a pair of lead wires 5a which in turn are connected to any known alarm indicating device (not shown), such as disclosed in U.S. Pat. No. 3,556,258, for example. The indicator is enclosed in an insulating plastic, such as epoxy resin as shown in FIGS. 2 through 4, which is easily cut or abraded.

The wear indicator 6 is designed in such a manner that, when it is inserted in the hole 9, the tip of the electrical conductor 5 extends into the pad 3 for a distance corresponding to the safety limiting thickness 4 for wear.

As the friction lining is worn away due to friction with the disc, the insulating plastic top of the wear indicator 6 shown in FIG. 2 is worn away to expose the electrical conductor 5, which then comes into contact with the disc. Thus the alarm can be generated by the electrical contact between the conductor 5 and the disc connected electrically to the ground, or by the opening of an electric circuit connected to conductor 5, due to the breaking and interruption of the U-shaped portion of the electrical conductor 5 by the abrasion caused by the rotating disc.

It is desired that the portion of the electrical conductor 5 to be interrupted extend substantially normal to the direction of rotation of the disc, because, if the conductor 5 extends parallel to the rotation direction of the disc, the conductor becomes powderized through the abrasion with the disc into copper powder which then extends along the surface of the insulating body of the indicator 6, thereby inhibiting complete electrical interruption even if the conductor 5 is cut.

A thin plate 8, shown in FIG. 4, put between the backing plate 2 and the pressing device is, usually, used for preventing squealing from being generated during a braking operation, and/or uneven abrasion of the friction pad is prevented by the provision of slots 16 on a portion of the plate areas engaged by pistons 11 and 12. In this invention, the thin plate 8 is modified so that it is clamped to the backing plate 2 by means of two hooks 18 disposed at the lower edge of the thin plate.

As shown in the exploded view of FIG. 4, the wear indicator 6 is inserted into the insertion hole 9 in the direction illustrated, and then the thin plate 8 is secured to the back of the backing plate 2. Plate 8 is secured to plate 2 as follows. After the two hooks 18 are engaged with plate 2 through the two corresponding recesses or slots 19 formed in friction pad 3 on opposite sides of the insertion hole 9, the pad 3, wear indicator 6 and thin plate 8 are incorporated into the fixing caliper 14 while assembled with each other. Guide pins 15, passing respectively through pin apertures 13 in the backing plate 2 and corresponding apertures 20 in the thin plate 8, keep the thin plate 8 from disengaging in the direction of arrow B. Furthermore, the wear indicator 6 is securely clamped to the friction pad 3 by the engagement of the hooks 18 with the backing plate 2 at both sides of the indicator.

In the foregoing, though the lining pad is provided on its bottom edge with two recesses or slots, it is also possible to construct so that the backing plate has a space(s) for engaging with hooks instead of providing the lining pad with two recesses or slots.

For preventing reduction in the frictional effect of the braking face of the disc due to the contamination thereof, a radially extending drain 21 is provided in the center of the friction lining 1 as disclosed, for instance, in Japanese Pat. No. 24474/1963. In such an arrangement, however, the top of the wear indicator 6 is exposed in a portion of the drain 21 and, hence, the wear indicator 6 would tend to be pressed and forced backward out of the insertion hole 9 by the contaminants collected in the drain 21.

However, in this invention, the wear indicator 6 is pressed from its back side and prevented from retraction by the thin plate 8 secured by the hooks 18 to backing plate 2, and thereby is precisely maintained at the distance corresponding to the safety limiting thickness 4.

As will be appreciated from the foregoing, the wear alarm apparatus of this invention is simple in structure, easily replaceable and, therefore, is of highly practical value when mounted, for example, in the wheels of an automobile.

While the invention has been described in detail and with reference to specific embodiments thereof, it will be apparent to one skilled in the art that various changes and modifications can be made therein without departing from the spirit and scope thereof.

We claim:
1. A brake pad and brake wear indicator assembly for use in a disc brake which includes a rotatable disc and means for pressing the assembly against the disc so that the brake pad frictionally engages the disc, said assembly comprising:
    a friction brake lining pad,
    a backing plate secured to the rear surface of said lining pad, with the front surface thereof being disposed adjacent said rotatable disc for frictional engagement therewith,
    a peripherally-closed insertion hole formed in said backing plate and extending into said lining pad for a distance corresponding to the length of the wear indicator.
    a brake wear indicator inserted in said hole and comprising an electrical conductor adapted to be engaged by said disc when said lining pad wears down to a desired safe thickness, and
    a shim plate clamped to said backing plate and covering said insertion hole to prevent said wear indicator from being forced backward out of said hole when said assembly is pressed against said disc.

2. An assembly as defined in claim 1, wherein said shim plate is provided on its lower edge with two hooks which securely engage said backing plate, and means for securing the top edge of said shim plate to said backing plate.

3. An assembly as defined in claim 1 wherein said electric conductor has a U-shaped portion extending substantially normal to the direction of the rotation of the disc.

4. An assembly as defined in claim 2 wherein said indicator is L-shaped so that the tip of said conductor is perpendicular to said disc, and wherein said indicator comprises an easily abraded insulating material in which said conductor is embedded.

5. An assembly as defined in claim 2 wherein said lining pad has formed in its front surface a drain slot which intersects said insertion hole.

* * * * *